United States Patent Office 2,866,732
Patented Dec. 30, 1958

2,866,732
METAL DERIVATIVES OF ORGANIC PHOSPHATES AND PHOSPHITES

Melvern C. Hoff, Highland, Ind., Ellis Kirby Fields, Chicago, Ill., and Roger W. Watson, Highland, Ind., assignors to Standard Oil Company, Chicago, Ill., a corporation of Indiana No Drawing. Application July 19, 1954
Serial No. 444,398

17 Claims. (Cl. 167—22)

The present invention relates to novel metal derivatives of organic phosphates and phosphites. More particularly, it relates to molybdenum and vanadium derivatives of such organic phosphorus compounds and to the method of preparing the same.

It has been discovered that organic phosphorus-containing compounds of the class including phosphates and phosphites and which may be represented by the general formula $(RM)_xP(M')_y(M''H)_z$, may be readily reacted with certain hereinafter defined molybdenum or vanadium compounds and hydrogen peroxide to produce stable organo-metal complexes. In the foregoing general formula R represents a hydrocarbon radical containing from 2 to about 40 carbon atoms, and preferably from about 8 to about 30 carbon atoms, selected from the group consisting of alkyl, aryl, cycloalkyl and aralkyl radicals; M, M' and M'' may be either oxygen or sulfur atoms and these atoms may vary throughout the molecule or be all the same, i. e., all oxygen or all sulfur or one or more of each; $x$ is a number from 1 to 3 inclusive; $y$ is a number from 0 to 1 inclusive; $z$ is a number from 0 to 2 inclusive; and the sum of $x$ and $z$ is always 3.

In connection with the use of the foregoing general formula it is, of course, recognized that, in accordance with the modern electronic theory of structure of molecules such as the phosphites, what may be conveniently represented as hydroxyl groups may not actually be such in the classic sense, but instead, the hydrogen of the hydroxyl group is believed to be attached to the phosphorus atom by a polar, semi-double bond which is often represented by an arrow rather than the usual double bond. It should be understood that the use of the general formula above is in no way intended to preclude or contradict the modern electronic theory.

The reaction of the organic phosphorus compounds with the metal compound and hydrogen peroxide occurs readily at temperatures in the range of from about 25° to about 200° F. and is preferably carried out at a temperature from about 70° to about 130° F. A reaction time from about 2 to 16 hours and preferably from about 4 to 10 hours (which includes the initial addition of the hydrogen peroxide added dropwise to the mixture of metal compound and organic phosphorus compound, and additional stirring for a number of hours after hydrogen peroxide addition is complete) has been found to be desirable. Quantities of the various reactants may vary over a relatively wide range; these will be referred to in detail in the ensuing description of the invention. The precise chemical structure of the products obtained in accordance herewith is not fully understood. It is believed that they are stable organo-metallic complexes.

Examples of the various primary $(ROPO_2H_2)$, secondary $[(RO)_2POH]$, and tertiary $[(RO)_3P]$ phosphites which may be employed in accordance with the present invention are ethyl phosphite, propyl phosphite, butyl phosphite, hexyl phosphite, decyl phosphite, dodecyl phosphite, 2-ethylhexyl phosphite, octadecyl phosphite, benzyl phosphite, cyclopentyl phosphite, etc.; diethyl phosphite, dibutyl phosphite, dihexyl phosphite, dioctadecyl phosphite, dibenzyl phosphite, etc.; and triethyl phosphite, tribenzyl phosphite, tricyclohexyl phosphite, etc. The corresponding thio and dithio analogues of phosphites of the foregoing enumerated type may also be reacted in accordance herewith.

Among the organic phosphates which may be reacted with heavy metal oxides and hydrogen peroxide, in accordance herewith, are the primary $[(RO)P(O)(OH)_2]$, secondary $[(RO)_2PO(OH)]$ and tertiary $[(RO)_3PO]$ phosphates. Those radicals represented by R are of the type hereinabove generally defined; for example, ethyl, propyl, butyl, hexyl, decyl, dodecyl, 2-ethylhexyl, cyclohexyl, cyclopentyl, benzyl, etc. The various sulfur-containing analogues of the foregoing class of organic phosphates may also be reacted with hydrogen peroxide and appropriate metal compound to produce useful organo-metallic complexes. Thus, without going into detail, those phosphates where one or more of the oxygen atoms are substituted by sulfur atoms may be employed in accordance herewith.

Although various specific organic phosphites and phosphates have been hereinabove enumerated, it should be understood that these have been set forth for purposes of illustration rather than limitation, and that any organic phosphate or phosphite falling within the general definition may be reacted in accordance herewith to form the novel complexes of the present invention.

The metal compounds employed in accordance herewith are the oxides and sulfides of molybdenum and vanadium and those compounds of vanadium and molybdenum affording oxides of molybdenum or vanadium under reaction conditions. The latter compounds include the salts of molybdic or vanadic acid with weak bases, the various molybdenum and vanadium sulfides hereinafter set forth, etc. For purposes of the present invention, a weak base shall be defined as one having a dissociation constant of about $1 \times 10^{-3}$ or lower. Examples of such bases particularly suitable for forming salts with molybdic or vanadic acids are ammonium hydroxide, triethylammonium hydroxide, etc. Of the oxides of molybdenum, molybdenum trioxide is preferably employed although other oxides of molybdenum, such as molybdenum dioxide and molybdenum sesquioxide, may also be employed. Similarly, the various oxides of vanadium are suitable; the trioxide, however, is preferred. The various sulfides of the two metals may also be employed. Thus, $MoS_4$, $MoS_3$, $MoS_2$, $V_2S_2$, $V_2S_3$ and $V_2S_5$ may be used. The amount of metal compound which may be combined with the organic phosphorus compounds varies to some extent with the particular compound employed as well as the quantity of $H_2O_2$ present as will hereinafter be referred to. Thus, the ratio, on a weight basis, of metal compound to organic phosphorus compound may be from about 1:1 to about 1:40 and preferably from about 1:3 to about 1:20.

Hydrogen peroxide is preferably employed in an aqueous solution in accordance herewith. Thus, it has been found most satisfactory to employ a solution of hydrogen peroxide containing from about 5% to about 90% hydrogen peroxide, and preferably from about 15 to about 50%. The amount of peroxide employed, calculated as 100% hydrogen peroxide, may vary from about 1 part hydrogen peroxide to 20 parts metal compound, to about 4 parts hydrogen peroxide to 1 part metal compound, and preferably is from about .2 to about 2 parts of peroxide per part of metal compound.

A solvent may be employed as a reaction medium although such is not essential. Solvents such as a light paraffin, e. g., hexane, or aromatics such as benzene, are suitable for this purpose.

For purposes of illustrating the present invention, the following operating examples are set forth. In these examples, unless otherwise specified, quantities of reactants, etc. are given in parts by weight.

EXAMPLE 1

A mixture of 190 grams (.56 mole) of dinonyl phosphite and 86.4 grams (.6 mole) $MoO_3$ were stirred while 84 ml. of 30% $H_2O_2$ (.37 mole) were added over a period of two hours. After the hydrogen peroxide had been added, the reaction mixture was stirred for an additional 16 hours at room temperature. Hexane was added, the oil phase was separated, dried and filtered and the hexane was evaporated off to yield a reddish-orange oil which, upon heating to around 230° F., turned bright blue. The product contained 11.57% molybdenum and 5.69% phosphorus. Addition of 1% of this product to an SAE base oil resulted in increasing the Almen E. P. rating from 6–8 kg. for the base oil to 18–20 kg. Moreover, 0.75% of the product added to an SAE 30 base oil containing 3.3% of a barium neutralized reaction product of $P_2S_5$ and a butylene-isobutylene polymer of about 1000 molecular weight improved the EMD test (a corrosion test developed by the Electromotive Division of General Motors Corp., and hereinafter described in detail) from a weight loss of 22 mg. to 16 mg.

In a second test of its corrosion preventing properties (the SSCT or Stirring Sand Corrosion Test which, along with the EMD test, is described below) 0.75% of the product resulted in improving an SAE 30 base oil containing the barium-containing neutralized reaction product of $P_2S_5$ and a butylene-isobutylene polymer of about 800 molecular weight from a weight loss of 450 mg. at 48 hours and 930 mg. at 72 hours to 120 mg. at 48 hours and 225 mg. at 72 hours respectively.

The remaining examples are set forth in Table I and it should be understood that the order of addition of the reactants was the same as in Example 1. The other necessary experimental information is given in the table.

venting corrosion and this utility is particularly apparent in connection with the phosphorus-containing detergent type additives. The EMD test and the SSCT test referred to in Example 1 are explained hereinafter.

In the EMD test (a corrosion test of the Electromotive Division of General Motors Corp.) a silver strip 2 cm. x 5.5 cm. with a small hole at one end for suspension is lightly abraded with No. 0 steel wool, wiped free of any adhering steel wool, washed with carbon tetrachloride, air-dried and then weighed to 0.1 milligram. Three hundred cc. of the oil to be tested is placed in a 500 cc. lipless glass beaker and the oil is heated to a temperature of 300° F. (±2° F.) and the silver test strip suspended in the oil so that the strip is completely immersed therein. The oil in the beaker is stirred by means of a glass stirrer operating at 300 R. P. M. At the end of twenty-four hours, the silver strip is removed and while still hot, rinsed thoroughly with carbon tetrachloride and air-dried. The appearance of the strip is then visually noted and given ratings according to the following scale:

(1) Bright
(2) Stained
(3) Grey-black
(4) Black, smooth
(5) Black, flake

After the visual inspection the silver strip is immersed in a 10% potassium cyanide solution at room temperature until the silver surface assumes its original bright or silver appearance. The silver strip is then washed successively with distilled water and acetone, air-dried, and weighed. A weight loss of 20 mg. or less is considered passing.

The SSCT test (Stirring Sand Corrosion Test developed by Standard Oil Company) is conducted as follows: A copper-lead test specimen is lightly abraded with steel wool, washed with naphtha, dried and weighed to the nearest milligram. The cleaned copper-lead test specimen is suspended in a steel beaker, cleaned with a hot trisodium phosphate solution, rinsed with water, acetone and dried, and 250 grams of the oil to be tested, together

Table I

| Example | Phosphorus Compound | Metal Comp'd | Mole Ratio of Metal Comp'd: P-Comp'd: $H_2O_2$ | Time, Hrs.[1] | Temp., °F. | Product Percent Mo or V | Product Percent P |
|---|---|---|---|---|---|---|---|
| 2 | tributyl phosphite | $MoO_3$ | .5:1:1 | 2(13) | 75 | 21.4 | 16.3 |
| 3 | tri-n-dodecyl trithiophosphite | $MoO_3$ | 1.5:1:.5 | | 75 | 4.81 | |
| 4 | di-2-ethyl-hexyl phosphite | $MoO_3$ | .5:1:1.5 | 2(16) | 77–113 | 4.48 | 6.42 |
| 5 | ...do | $V_2O_3$ | .5:1:2 | 1(15) | 75 | 5.66 | 9.04 |
| 6 | triisooctyl phosphite | $V_2O_3$ | .5:1:1.3 | 1.5(15) | 75 | 1.49 | 8.15 |
| 7 | tributyl phosphate | $MoO_3$ | .5:1:1.5 | .5(16) | 75 | 8.08 | 9.9 |
| 8 | trinonyl phosphate | $MoO_3$ | .5:1:1.5 | 16 | 75 | 7.92 | 5.48 |
| 9 | trinonyl phosphite | $MoO_3$ | .7:1:1.1 | 1(24) | 75 | 8.95 | 6.1 |
| 10 | dinonyl phosphite | $MoS_3$ | .5:1:1.5 | 1(16) | 75 | 4.01 | 11.1 |
| 11 | ...do | $(NH_4)_2MoO_4$ | .75:1:1.8 | 1.5(14) | 75 | 9.53 | 9.87 |

[1] Number in parentheses indicates additional period of stirring after $H_2O_2$ addition was completed.

As is demonstrated in Example 1, the novel complexes of the present invention have considerable utility for lubricant additives. In addition, they have been found useful as fungicides, giving increased early blight control, increased protection against anthracnose and a reduction in the number of lesions due thereto on tomatoes. Moreover, peach brown rot has been found to be substantially inhibited by the use of a fungicide of this type.

It is important to note in connection with the present invention that all attempts to react either a molybdenum or vandium compound with members of the class herein disclosed phosphorus compounds, in the absence of hydrogen peroxide, met with utter failure. On the other hand, the reaction involving the three components goes readily under mild conditions.

As pointed out in Example 1, the materials of this invention have utility in lubricants for the purpose of preventing with 0.625 gram lead oxide and 50 grams of a 30–35 mesh sand, charged to the beaker. The beaker is then placed in a bath or heating block and heated to a temperature of 300° F. (±2° F.) while the contents are stirred by means of a stirrer rotating at 750 R. P. M. The contents of the beaker are maintained at this temperature for twenty-four hours, after which the copper-lead test specimen is then replaced in the beaker and an additional 0.375 gram of lead oxide added to the test oil. At the end of an additional twenty-four hours of test operation the test specimen is again removed, rinsed and dried as before, and weighed. The test specimen is again placed in the beaker together with an additional 0.250 gram of lead oxide and the test continued for another twenty-four hours (seventy-two hours total). At the conclusion of this time, the test specimen is removed from the beaker, rinsed in naphtha, dried and weighed.

The loss in weight of the test specimen is recorded after each weighing. A weight loss of 200 mg. or less in 48 hours and 500 mg. or less in 72 hours is allowable.

The novel complexes of the present invention, when added to mineral lubricating oils, may be employed in an amount of from about 0.05% to about 10% and preferably from about 0.2% to about 5%.

When employing the materials of the present invention as fungicides, they may be utilized and applied as a sole active ingredient in carriers such as dusts, solvents, aqueous dispersions or other carriers frequently used in the art. In addition, they may be employed in combination with other fungicides.

Having thus described our invention, what we claim as novel and desire to protect by Letters Patent is as follows:

1. A composition of matter resulting from the reaction of (1) hydrogen peroxide, (2) a compound selected from the group consisting of the oxides and sulfides of molybdenum and vanadium and the salts of molybdic and vanadic acids with weak bases and (3) an organic phosphorus compound having the general formula $$(RM)_xP(M')_y(M''H)_z$$

wherein R represents a hydrocarbon radical selected from the group consisting of alkyl, cycloalkyl, aralkyl radicals, M, M' and M'' are constituents selected from the group consisting of sulfur and oxygen atoms, $x$ is a value from 1 to 3 inclusive, $y$ is a value from 0 to 1 inclusive, $z$ is a value from 0 to 2 inclusive and the sum of $x$ and $z$ is 3.

2. A composition comprising a hydrocarbon oil containing from about 0.05% to about 10% of the composition of claim 1.

3. The reaction product of a molybdenum oxide, an alkyl phosphite having from 1 to 3 alkyl groups wherein each alkyl group contains from about 2 to about 40 carbon atoms, and hydrogen peroxide.

4. A fungicidal composition consisting essentially of the composition of claim 3 and a substantially greater amount of a fungicidally inert carrier therefor.

5. The composition of claim 3 wherein the alkyl phosphite is dinonyl phosphite.

6. The composition of claim 3 wherein the alkyl phosphite is triisooctyl phosphite.

7. The composition of claim 3 wherein the alkyl phosphite is trinonyl phosphite.

8. A composition comprising a hydrocarbon oil containing from about 0.05% to about 10% of the composition of claim 3.

9. The reaction product of $MoO_3$, hydrogen peroxide and an alkyl phosphite having from 1 to 3 alkyl groups wherein each alkyl group contains from about 2 to about 40 carbon atoms.

10. The reaction product of a molybdenum oxide, an alkyl phosphate having from 1 to 3 alkyl groups wherein each alkyl group contains from about 2 to about 40 carbon atoms and hydrogen peroxide.

11. The composition of matter of claim 10 wherein the alkyl phosphate is tributyl phosphate.

12. The composition of claim 10 wherein the alkyl phosphate is trinonyl phosphate.

13. A composition comprising a hydrocarbon oil containing from about 0.05% to about 10% of the composition of claim 10.

14. The method of preparing a complex of an organic phosphorus compound and a metal compound selected from the group consisting of a molybdenum compound and a vanadium compound comprising adding hydrogen peroxide at a temperature in the range of from about 25° to about 200° F. to a mixture of a compound selected from the group consisting of the oxides and sulfides of molybdenum and vanadium and the salts of molybdic and vanadic acids with weak bases, and an organic phosphorus compound having the general formula $$(RM)_xP(M')_y(M''H)_z$$

wherein R represents a hydrocarbon radical containing from 2 to about 40 carbon atoms, said hydrocarbon radical selected from the group consisting of alkyl, cycloalkyl and aralkyl radicals, M, M' and M'' are constituents selected from the group consisting of sulfur and oxygen atoms, $x$ is a value from 1 to 3 inclusive, $y$ is a value from 0 to 1 inclusive, $z$ is a value from 0 to 2 inclusive and the sum of $x$ and $z$ is 3.

15. The method of claim 14 wherein the organic phosphorus compound is an alkyl phosphite having from 1 to 3 alkyl groups wherein each alkyl group contains from about 2 to about 40 carbon atoms.

16. The method of claim 14 wherein the organic phosphorus compound is an alkyl phosphate having from 1 to 3 alkyl groups wherein each alkyl group contains from about 2 to about 40 carbon atoms.

17. The method of preparing a complex of an organic phosphorus compound and a metal compound selected from the group consisting of a molybdenum compound and a vanadium compound comprising adding hydrogen peroxide at a temperature in the range of from about 25° to about 200° F. to a mixture of a hydrocarbon solvent, a compound selected from the group consisting of the oxides and sulfides of molybdenum and vanadium and the salts of molybdic and vanadic acids with weak bases, and an organic phosphorus compound having the general formula $(RM)_xP(M')_y(M''H)_z$ wherein R represents a hydrocarbon radical containing from 2 to about 40 carbon atoms, said hydrocarbon radical selected from the group consisting of alkyl, cycloalkyl and aralkyl radicals, M, M' and M'' are constituents selected from the group consisting of sulfur and oxygen atoms, $x$ is a value from 1 to 3 inclusive, $y$ is a value from 0 to 1 inclusive, $z$ is a value from 0 to 2 inclusive and the sum of $x$ and $z$ is 3 and separating the resultant complex from said solvent.

References Cited in the file of this patent

UNITED STATES PATENTS

| | | |
|---|---|---|
| 1,939,951 | Buchanan | Dec. 19, 1933 |
| 2,005,619 | Graves | June 18, 1935 |
| 2,224,695 | Prutton | Dec. 10, 1940 |
| 2,329,707 | Farrington et al. | Sept. 21, 1943 |
| 2,346,155 | Denison et al. | Apr. 11, 1944 |
| 2,368,000 | Cook | Jan. 23, 1945 |
| 2,410,650 | Glammaria | Nov. 5, 1946 |
| 2,438,876 | Reiff | Mar. 30, 1948 |
| 2,514,150 | Bell | July 4, 1950 |